J. B. LIVEZEY.
Cultivator.
No 29,087.
Patented July 10, 1860.
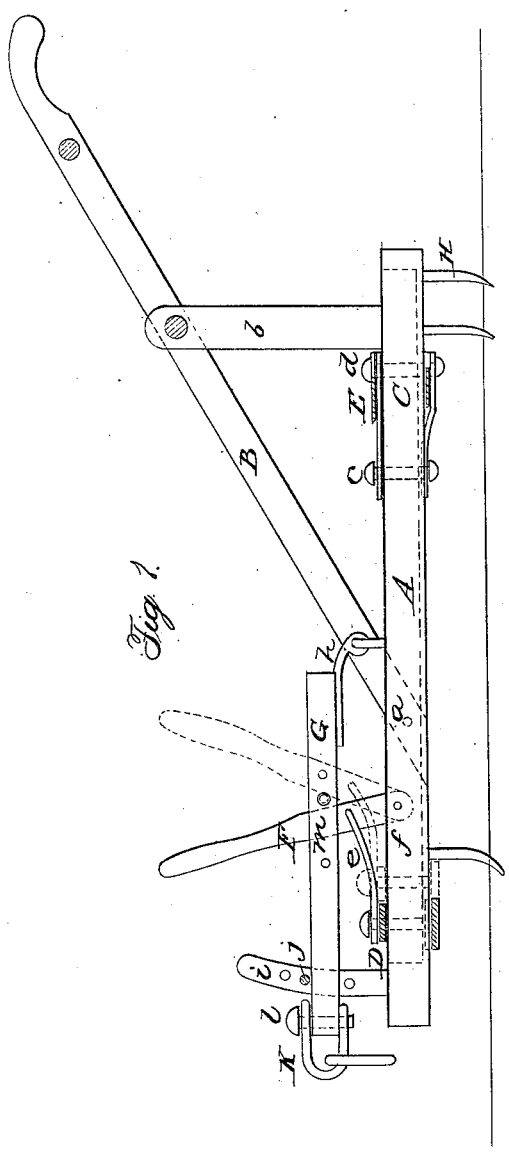
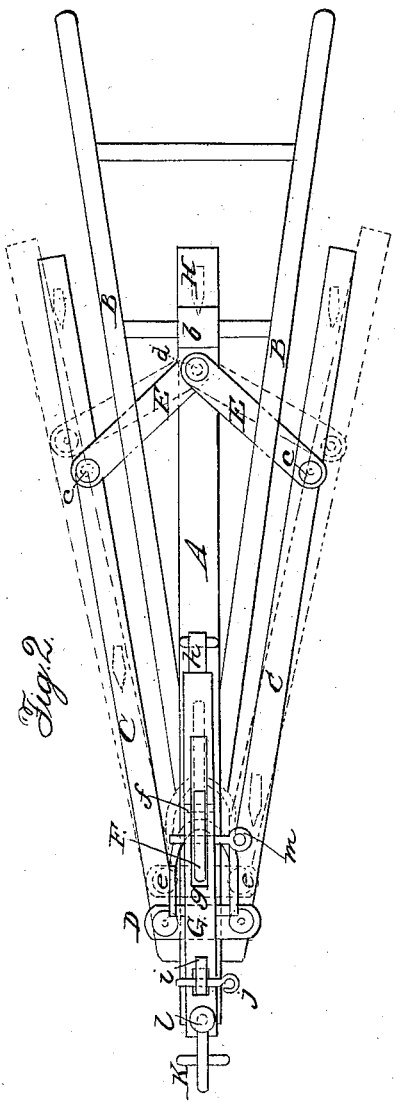

UNITED STATES PATENT OFFICE.

J. B. LIVEZEY, OF CLARKSBOROUGH, NEW JERSEY.

IMPROVEMENT IN CULTIVATORS.

Specification forming part of Letters Patent No. 29,087, dated July 10, 1860.

*To all whom it may concern:*

Be it known that I, J. B. LIVEZEY, of Clarksborough, in the county of Gloucester and State of New Jersey, have invented a new and Improved Cultivator; and I do hereby declare that the following is a full, clear, and exact description of the same, reference being had to the accompanying drawings, forming a part of this specification, in which—

Figure 1 represents a longitudinal vertical section of this invention. Fig. 2 is a plan or top view of the same.

Similar letters of reference in both views indicate corresponding parts.

This invention relates to that class of cultivators which are used for cultivating corn, potatoes, and other drill-plants, and which are constructed with two wings that can be adjusted according to the width of the furrow through which the cultivator is to pass.

My invention consists in the arrangement, in combination with the side wings, of a sliding head operated with a hand-lever and fastened to both wings in front, together with two pivoted links, which connect the rear parts of said wings to the beam in such a manner that said wings, on being expanded or contracted, receive at the same time a longitudinal sliding motion, thereby rendering my cultivator better adapted for different kinds of work than any cultivator heretofore constructed.

To enable those skilled in the art to fully understand and use my invention, I will proceed to describe its construction and operation with reference to the drawings.

A represents the beam of a cultivator or harrow, to which the handles B are secured by means of pivots *a* and by a standard, *b*, in the usual manner.

The side wings, C, are united in front by a cross-head, D, which slides on the beam, and their rear ends are connected to the beam by means of links E, which are fastened to the side wings by means of pivots *c* and to the beam by means of a pivot, *d*, so as to allow said links to turn freely in either direction.

The cross-head D is connected by means of a rod or link, *e*, to the hand-lever F, which has its fulcrum on a pivot, *f*, in the front of the beam A, and which swings freely backward and forward. It moves in a mortise, *g*, in the pole G, which is united to the beam by means of a hinge, *h*, in the rear, and the front end of which is adjustable up and down on a standard, *i*, with a series of holes to receive a pin, *j*, that serves to arrest the pole G in the desired position. The clevis *k* is secured to this pole by means of a bolt, *l*, and a pin, *m*, passing sidewise through this pole and through the mortise *g*, serves to confine the lever in the desired position. Instead of this pin, a rack or pawl might be used.

One tooth, H, is inserted into the rear end of the beam, and two or more teeth are inserted in each of the side wings, as clearly shown in the drawings. The back tooth in the beam, being made to follow in the rear of the back teeth in the wings of the latter, are contracted; but if by pushing back the hand-lever F the side wings are expanded, the back teeth of the wings come nearly in line with the back tooth of the beam. By thus changing the relative position of teeth on the wings toward the back tooth on the beam simultaneously in a longitudinal and in a lateral direction my cultivator adapts itself to different kinds of work. For instance, in cultivating potatoes it is desirable to make the back tooth of the beam follow far enough in the rear to leave a furrow; but when farming corn it is desirable to leave the ground level, and the back teeth in the side wings are arranged nearer the line with the back tooth of the beam. Such and other changes are made with ease and almost instantaneously, and all the parts of my cultivator are so constructed that there is no rattling about it while it is in operation, and that it does not get easily out of repair.

Having thus fully described my invention, what I claim as new, and desire to secure by Letters Patent, is—

The arrangement of the sliding cross-head D, pivoted links E, and hand-lever F, in combination with the side wings, C, and beam A, constructed and operating substantially as and for the purpose specified.

JOS. B. LIVEZEY.

Witnesses:
JAMES M. WOLF,
J. ALBERT WOLFE.